US005727302A

United States Patent [19]

Sawdon

[11] Patent Number: 5,727,302

[45] Date of Patent: Mar. 17, 1998

[54] DIE AND PUNCH FOR FORMING A JOINT AND METHOD OF MAKING THE DIE

[75] Inventor: Edwin G. Sawdon, St. Clair, Mich.

[73] Assignee: BTM Corporation, Marysville, Mich.

[21] Appl. No.: 687,352

[22] PCT Filed: Jul. 29, 1994

[86] PCT No.: PCT/US94/08569

§ 371 Date: Jul. 25, 1996

§ 102(e) Date: Jul. 25, 1996

[87] PCT Pub. No.: WO95/20461

PCT Pub. Date: Aug. 3, 1995

Related U.S. Application Data

[63] Continuation-in-part of Ser. No. 189,580, Jan. 31, 1994, Pat. No. 5,479,687.

[51] Int. Cl.$^{6}$ .............................. B23P 11/00; B23Q 1/00; B21K 5/20

[52] U.S. Cl. .............................. 29/436; 29/453; 29/243.5; 29/283.5; 76/4

[58] Field of Search .............................. 29/436, 453, 505, 29/521, 522.1, 243.5, 283.5; 76/4

[56] References Cited

U.S. PATENT DOCUMENTS

| | | |
|---|---|---|
| 1,404,126 | 1/1922 | Krause . |
| 2,670,885 | 3/1954 | Allen . |
| 3,468,527 | 9/1969 | Mather . |
| 3,690,141 | 9/1972 | Brownbill . |
| 4,208,776 | 6/1980 | Schleicher . |
| 4,757,609 | 7/1988 | Sawdon . |
| 4,825,525 | 5/1989 | Obrechet et al. . |
| 4,905,362 | 3/1990 | Obrechet et al. . |
| 4,910,853 | 3/1990 | Sawdon . |
| 4,930,203 | 6/1990 | Obrechet et al. . |
| 5,027,503 | 7/1991 | Sawdon . |
| 5,150,513 | 9/1992 | Sawdon . |
| 5,177,861 | 1/1993 | Sawdon . |

FOREIGN PATENT DOCUMENTS

| | | |
|---|---|---|
| 1 452 782 | 3/1965 | Germany . |
| 37 26 392 A1 | 2/1989 | Germany . |
| 62-148035A | 7/1987 | Japan . |
| 62-148036A | 7/1987 | Japan . |
| 62-148040A | 7/1987 | Japan . |
| 1299669 A1 | 3/1987 | U.S.S.R. . |

*Primary Examiner*—David P. Bryant
*Attorney, Agent, or Firm*—Harness, Dickey & Pierce, P.L.C.

[57] ABSTRACT

A die (24) and punch (32) is employed to form a joint (74) between at least two sheets of material (70; and 72). The preferred embodiment die (24) has a shield (54) surrounding an anvil (52). This shield (54) has at least one aperture (120) extending therethrough.

38 Claims, 5 Drawing Sheets

DIE AND PUNCH FOR FORMING A JOINT AND METHOD OF MAKING THE DIE

CROSS REFERENCE TO RELATED APPLICATION

This application is a continuation-in-part of a U.S. patent application Ser. No. 08/189,580 filed Jan. 31, 1994, now U.S. Pat. No. 5,479,687.

BACKGROUND AND SUMMARY OF THE INVENTION

This invention relates generally to a joint forming apparatus and specifically to a die and punch for forming a joint between sheets of material.

It is old in the art to join multiple pieces of sheet metal by punching or otherwise manipulating them to cause these sheets to be deformed into an interlocking relationship in a localized area. However, such joints have traditionally required the shearing of the sheet material and hence are not suitable for leakproof applications unless a sealant is applied. The formation of such joints is also frequently destructive of the corrosion resistance of coated materials. In addition, the known apparatuses for forming the joints are frequently complex in design. This complexity increases the cost of the equipment, as well as the energy required for operation.

More recently, the inventor of the present invention has developed an apparatus for producing more cost effective and aesthetically pleasing leakproof and lanced joints. These are known within the industry as TOG-L-LOC® and LANCE-N-LOC® joints which can be obtained from the assignee of the present invention. These improved joints are disclosed within U.S. Pat. No. 5,150,513 which issued on Sep. 29, 1992 and U.S. Pat. No. 5,177,861 which issued on Jan. 12, 1993, both of which are incorporated by reference herewithin.

Moreover, the use of coiled springs to inwardly retain a plurality of movable die pieces against an anvil for joining sheets of material is shown in Japanese Patents 148036 entitled "Joining Device for Thin Metallic Plate" and 148039 entitled "Joining Device for Metallic Sheet." However, in both of these devices, the coiled spring is not canted. Furthermore, an outer sleeve is not shown surrounding the spring and movable die pieces. These references also do not appear to disclose a stripper for use in combination with the punch.

The TOG-L-LOC® and LANCE-N-LOC® joints are commonly formed within a C-shaped toggle press. Such a toggle press is disclosed in U.S. Pat. No. 3,730,044 entitled "Fluid Operated Apparatus" which issued to the inventor of the present invention on May 1, 1973, and is incorporated by reference herewithin. Although such a conventional toggle press is cost effective and reliable, the punch and die tends to bow outward from their desired longitudinal axis during formation of a joint therebetween. Therefore, the edges of the punch and die anvil are highly stressed and may be prematurely worn or fracture.

In accordance with the present invention, the preferred embodiment of a die and punch assembly is employed to form a joint between at least two sheets of material. The preferred embodiment die has a shield surrounding an anvil. This shield has at least one aperture extending therethrough. In another aspect of the present invention a canted coil spring expandably retains at least three die blades between the shield and the anvil. In a further aspect of the present invention, the shield is snappably engagable with a die body. In yet another aspect of the present invention, an upper edge of at least one die blade is substantially coplanar with an upper edge of the shield prior to a joint being formed thereagainst. In still another aspect of the present invention, either the anvil, punch, or both has a frusto conical taper disposed along a peripheral edge thereof. In another aspect of the present invention, an external surface of a stripper has substantially the same diameter as does an outside surface of the shield.

The die and punch assembly of the present invention are advantageous over conventional devices in that an aperture in the present invention die shield allows for self-cleaning during operation. The present invention die shield and blades are also advantageous by having substantially coplanar upper edges so as to provide additional sheet material support during joint formation. Another advantage of the present invention is that the frusto conical taper on the punch, anvil, or both peripheral edge prevents high stress concentrations and improves the tool life. The snap together construction of the shield and die body allows for easy and low cost assembly and processing while achieving more uniform tolerances during heat treating. Additional advantage and features of the present invention will become apparent from the following description and appended claims, taken in conjunction with the accompanying drawings.

BRIEF DESCRIPTION OF THE DRAWINGS

FIG. 6 is a side elevational view showing a preferred embodiment shield used in the die of the present invention of FIG. 1;

DETAILED DESCRIPTION Of THE PREFERRED EMBODIMENT

Figure 1:
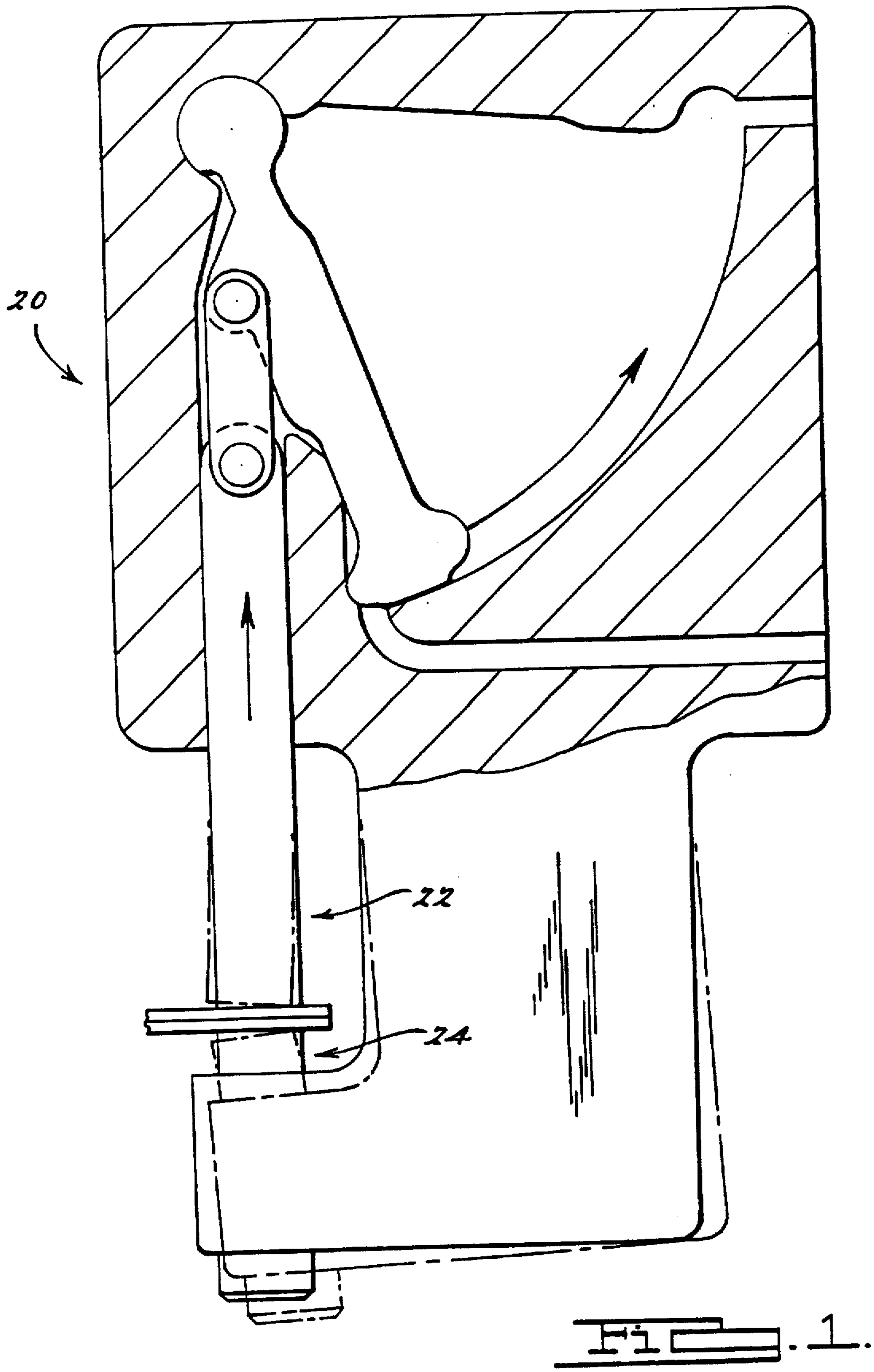
FIG. 1 is a diagrammatic side elevational view, partially in section, showing a toggle press employing a preferred embodiment of a punch assembly and a die of the present invention.

Referring to FIG. 1, a toggle press 20 is diagrammatically shown employing the preferred embodiment of a punch assembly 22 and a die 24 of the present invention. Such C-shaped toggle presses are well known within the art. When punch assembly 22 compressibly deforms a joint against die 24, punch assembly 22 and die 24 tend to bow outwardly with the press frame. Such an outward bow is shown in an exaggerated form by the phantom lines. However, this undesired bowing creates high stress loading on the peripheral contact edges of a die anvil and a punch. Of course, one skilled in the art would know that other traditional presses, such as hydraulic in-line presses or an accordion-type toggle press, could be employed with the punch assembly and die of the present invention.

Figure 2:
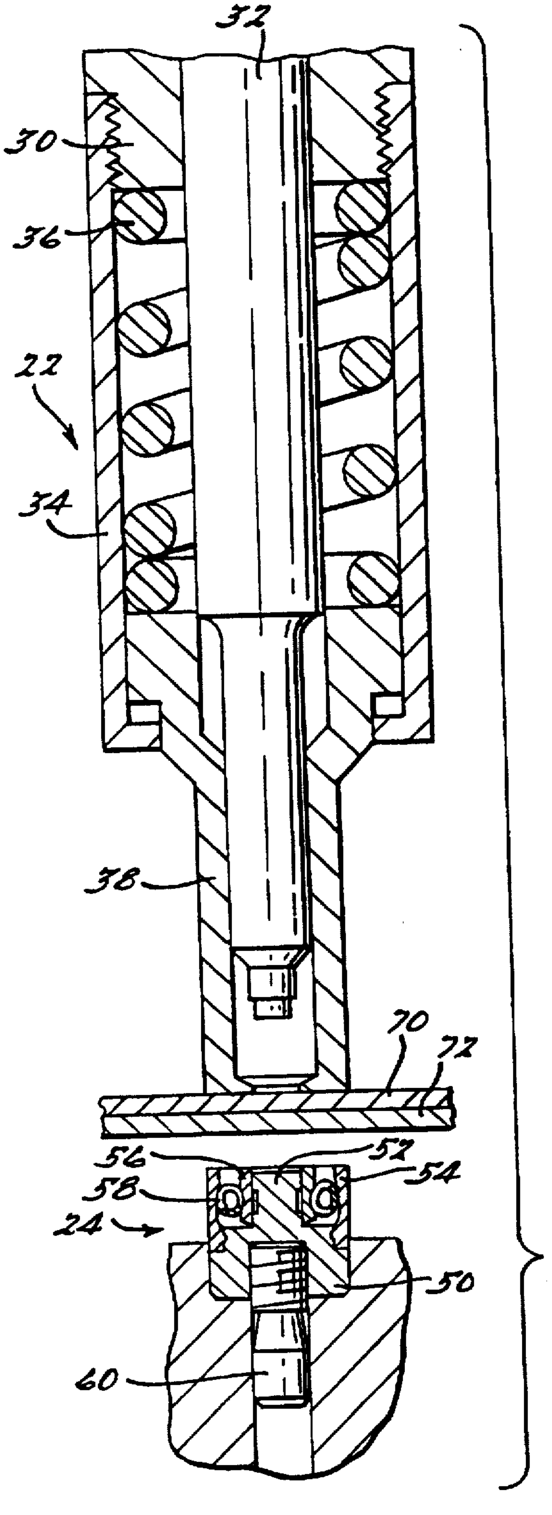
FIG. 2 is a front elevational view, partially in section, showing the preferred embodiment punch assembly of the present invention in its retracted position relative to the preferred embodiment die of the present invention of FIG. 1.
Figure 3:
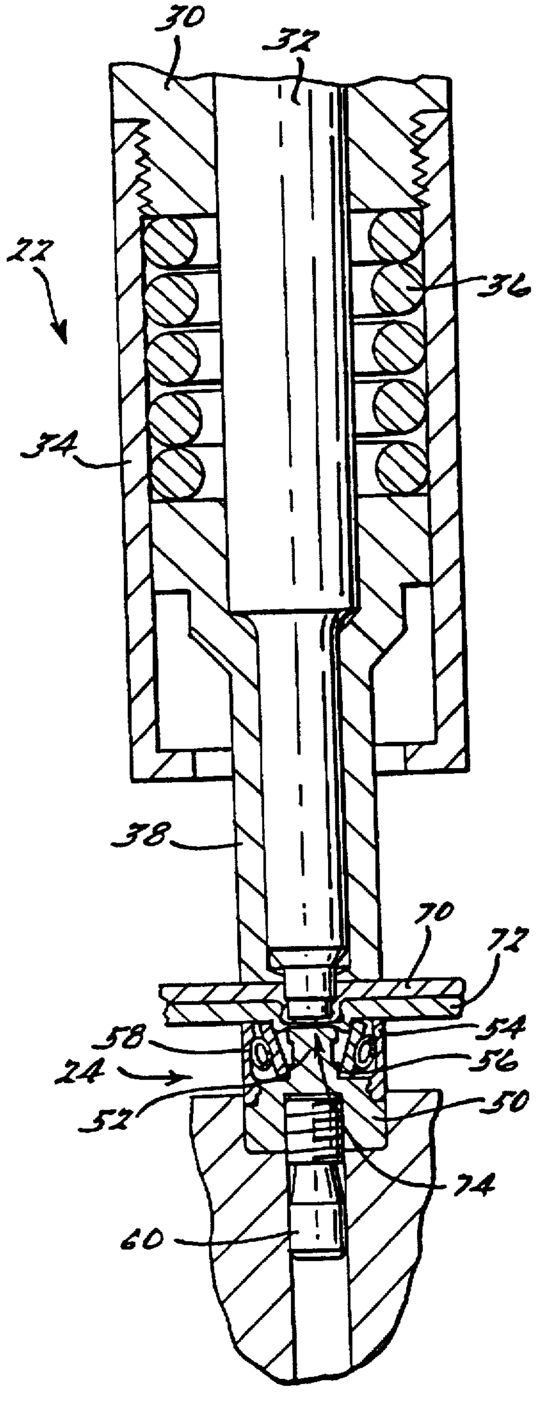
FIG. 3 is a front elevational view, partially in section, showing the preferred embodiment punch assembly of the present invention in its advanced position relative to the preferred embodiment die of the present invention of FIG. 1.
Figure 4:
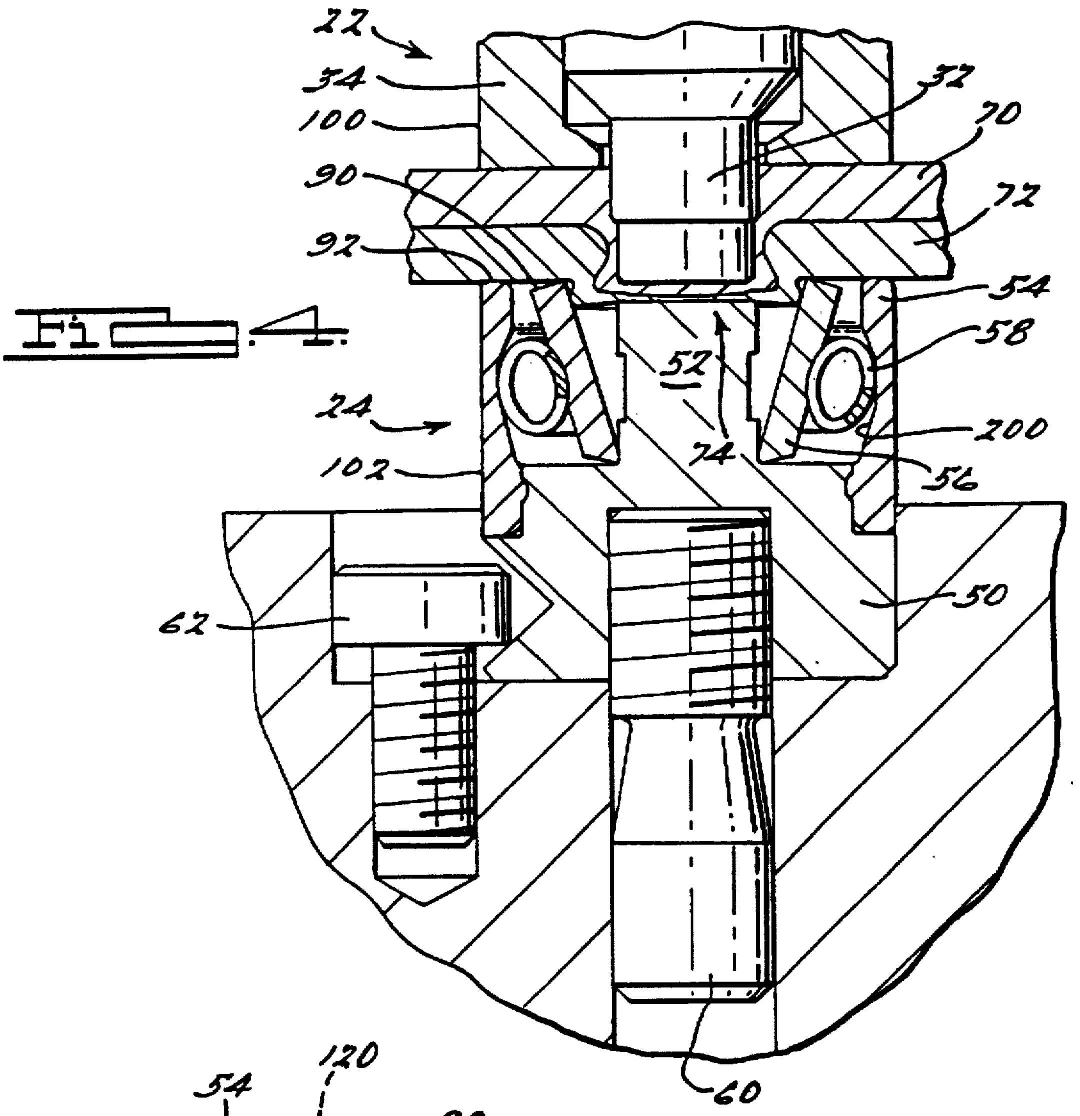
FIG. 4 is an enlarged front elevational view, partially in section, showing a joint created by the preferred embodiment punch assembly and die of the present invention of FIG. 1.

As can best be observed in FIGS. 2–4, punch assembly 22 includes a punch holder 30, a punch 32, a housing 34, a compression spring 36 and a stripper 38. Aligned therewith, die assembly 24 includes a die body 50 having an anvil 52 integral therewith, a shield or guard 54, three movable die blades 56, a canted coil spring 58, a dowl 60 and a bolt 62. At least two sheets of deformable material 70 and 72 are formed between punch assembly 22 and die 24 so as to create a leakproof interlocking joint 74. While three expandably movable die blades 56 are preferably disclosed herein, it should also be appreciated that a single stationary die blade may be disposed around anvil 52 with a trough therebetween. An elastomeric band, compression spring or leaf spring may alternately be employed to retain movable die blades 56 within die 24. Moreover, a LANCE-N-LOC® joint, an embossment, a bending operation or other such action may also be performed within the punch assembly and die of the present invention.

Figure 5:
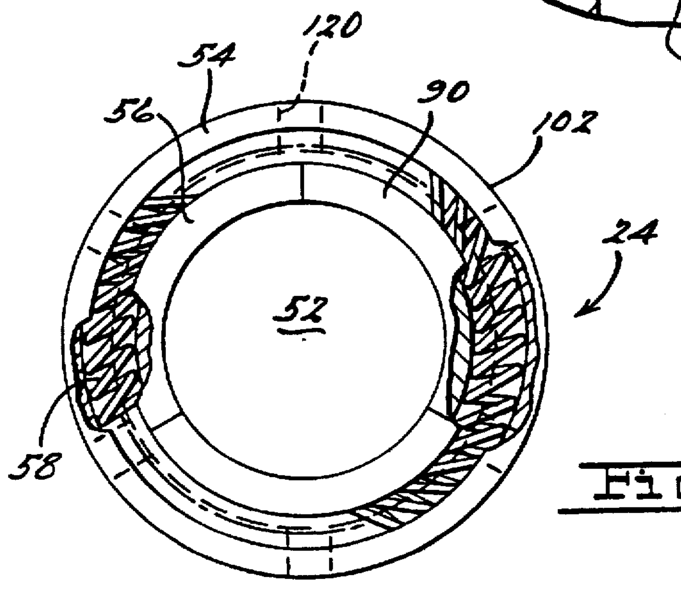
FIG. 5 is an enlarged top elevational view, with portions broken away therefrom, showing the preferred embodiment die of the present invention of FIG. 1.
Figure 7:
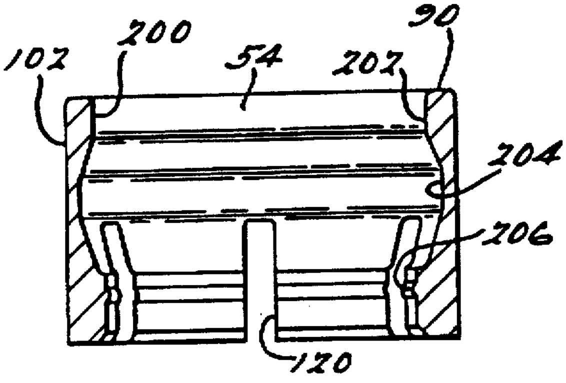
FIG. 7 is a fragmentary side elevational view showing the preferred embodiment shield used in the die of the present invention of FIG. 6.

Referring to FIGS. 4 and 5, each die blade 56 has an upper edge 90 which is substantially coplanar with an upper edge 92 of shield 54 prior to joint 74 being formed within die 24. This coplanar nature of the upper edges of die blades 56 (when in their nominal positions) and shield 54 provides for improved support of material sheets 70 and 72 during joint formation and removal from die 24. Materials sheets 70 and 72 are preferably steel or aluminum but may also be any other deformable material and may further be of varying thicknesses.

Stripper 34 is defined by an external surface 100 which has substantially the same diameter as does an outside cylindrical surface 102 of shield 54. This substantially identical diameter of stripper 34 and shield 54 provides for improved stripping action efficiency and uniform stripping action therebetween.

Figure 8:
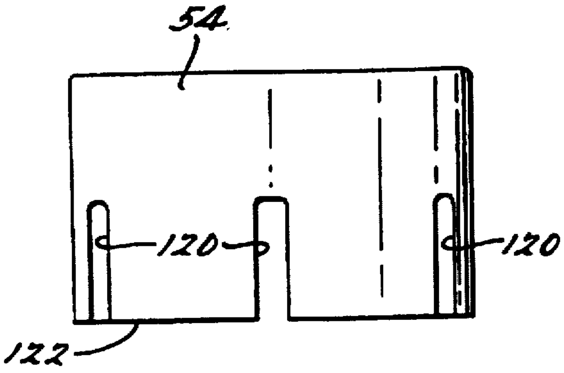
FIG. 8 is a side elevational view showing an alternate embodiment shield used in the present invention die of FIG. 1.
Figure 8:
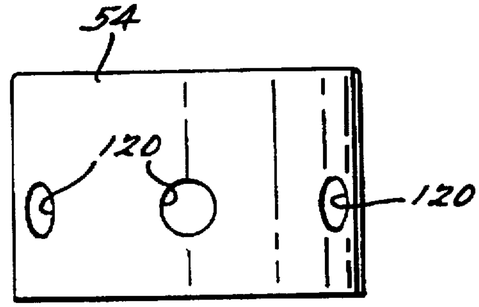
Figure 9:
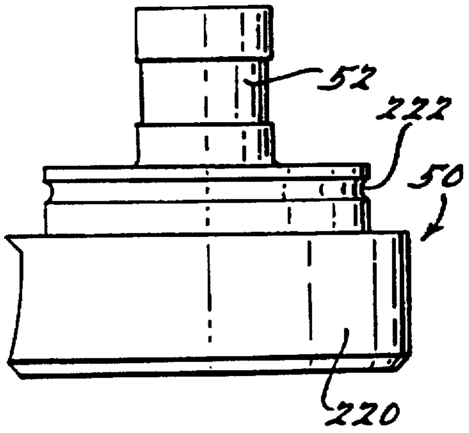
FIG. 9 is a side elevational view showing a preferred embodiment die body used in the present invention die of FIG. 1.
Figure 10:
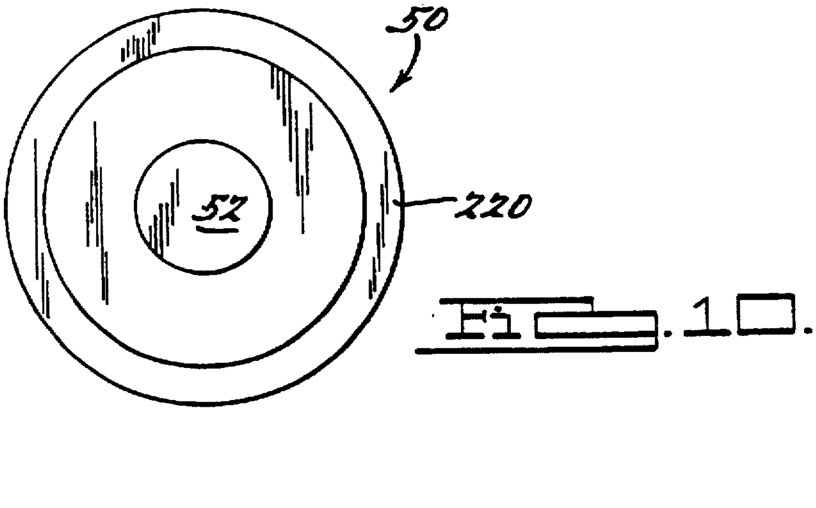
FIG. 10 is a top elevational view of the preferred embodiment body used in the present invention die of FIG. 9.

Referring now to FIGS. 5 and 6, shield 54 includes six slot shaped apertures 120 which are open toward a bottom edge 122 thereof. These slotted apertures 120 allow for self cleaning of die 24. Such self cleaning is achieved during normal movement of die blades 56 and canted spring 58. Accordingly, any lubricating or cooling fluid as well as dirt, sheet material oil and other debris may be expelled through slotted apertures 120. An alternate embodiment design of shield 54 is shown in FIG. 8. This alternate embodiment includes six evenly spaced apertures 120 each having a circular shape.

FIGS. 4, 7, 9 and 10 show shield 54 further having an inside surface 200 defined by a nominal segment 202, a spring retaining depressed segment 204 and a protruding ridged snap fit segment 206. Die body 50 includes a substantially cylindrical die foot 220 and anvil 52. A circumferential snap fit groove 222 is also disposed around a peripheral portion of die body 50. Groove 222 of die body 50 is designed to snappably receive protruding segment 206 of shield 54. Thus, shield 54 can be snap fittably attached to die body 50 by use of an arbor press applying approximately 40 foot pounds of force therebetween. Alternately, the groove and protruding snap fit means may be reversed or may take on flexible beam and barb configurations. Both shield 54 and die body 50 are made from M2 steel which are hardened and ground to Rc 57–61.

The snap fit attachment between shield 54 and die body 50 provides for processing efficiencies and improved tolerances between parts. Shield 54 and die body 50 are first individually machined to their desired shapes. Second, shield 54 is snapped onto die body 50. Third, the combined parts are heat treated and then burnished in a slurry of granite and water to remove burrs. A titanium nitride coating is then applied to the combined parts. Thereafter, canted coil spring 58 is inserted around die blades 56 and then the die blade and spring combination are installed within shield 54.

Figure 11:
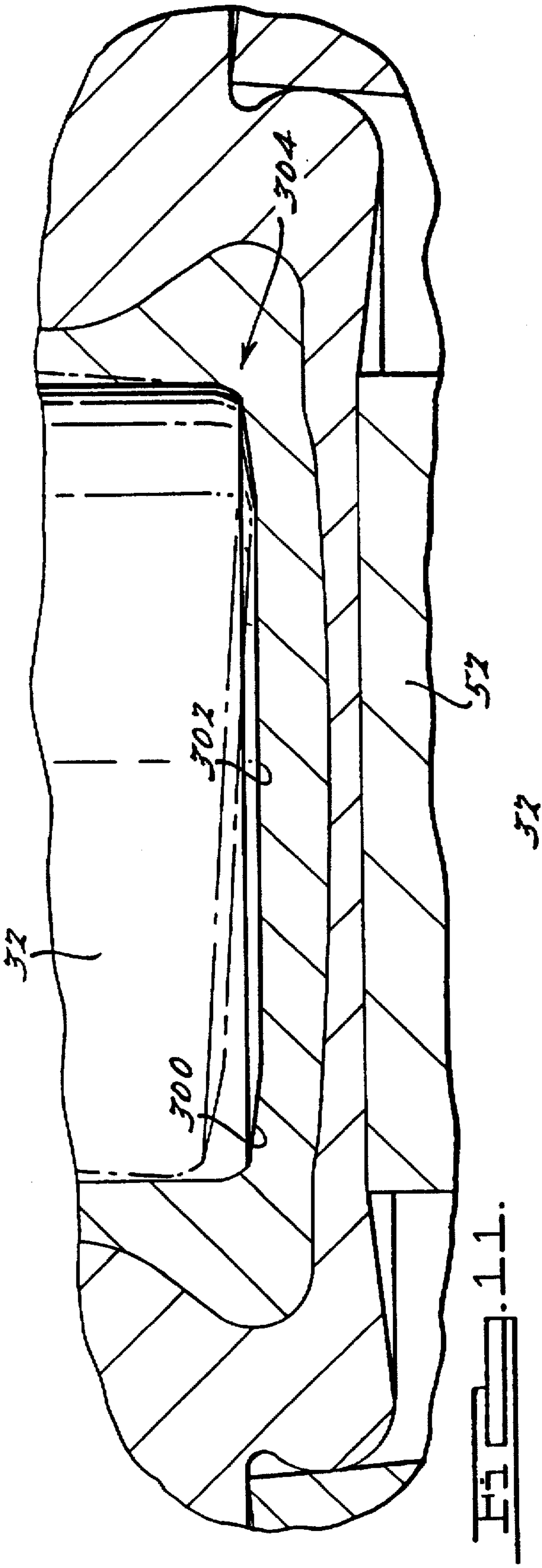
FIG. 11 is an enlarged cross sectional view showing a frusto conical taper disposed on a punch of the present invention of FIG. 4.
Figure 12:
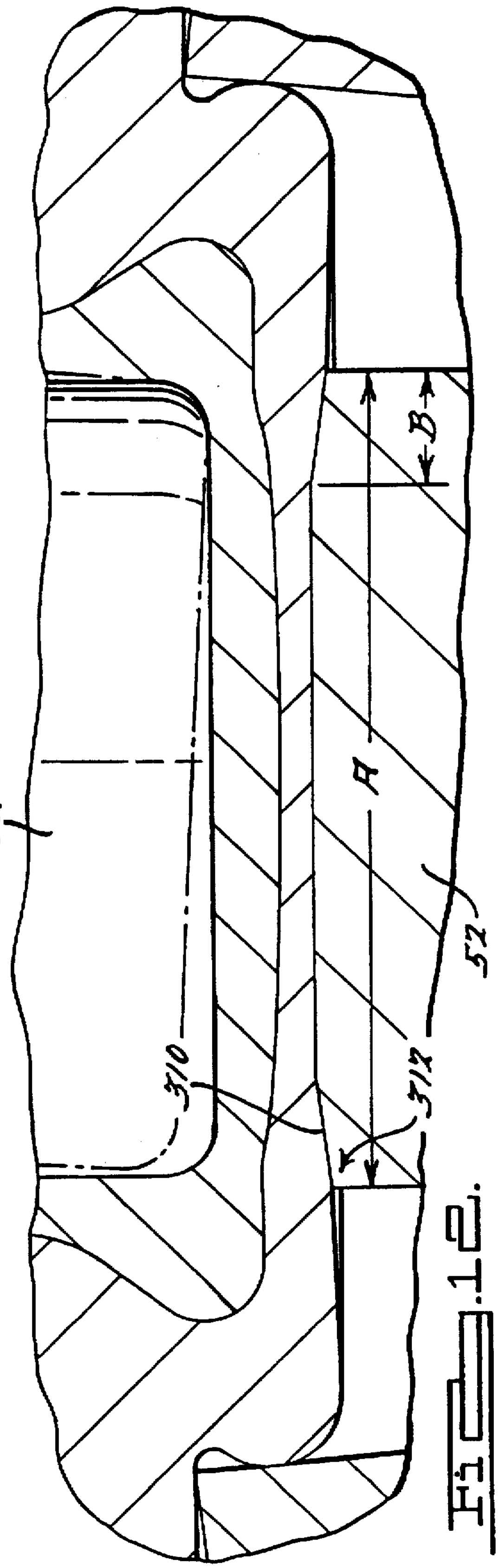
FIG. 12 is an enlarged cross sectional view showing a frusto conical taper disposed on an anvil of the present invention of FIG. 4.

Referring to FIG. 11, the present invention provides for a frusto conical taper 300 of 5° as measured from a plane defined by a contact surface 302 of punch 32. This taper 300 intersects with a radius of 0.010 inches disposed along a peripheral contact edge 304 of punch 32. Alternately, FIG. 12 shows a 5° frusto conical taper 310 disposed along a peripheral contact edge 312 around anvil 52 adjacent to a contact surface. A radius may also be disposed partially at the corner thereof. These frusto conical tapers can be calculated as follows:

$$B = \frac{(A \times 80\%) - A}{2}$$

where A is defined as the anvil diameter; and

B is the lateral dimension of the taper.

The tapers of FIGS. 11 and 12 serve to reduce stress concentrations along the corners of the anvil and punch during any misalignment and bowing that occurs during joint formation (as is shown in phantom). Of course, other angles may be employed for the tapers depending on the specific application.

While the preferred embodiment of this die and punch assembly have been disclosed, it will be appreciated that various modifications may be made without departing from the present invention. For example, an anvil may be separately retained to a die body. Furthermore, a shield may be attached to a die body by set screws, welding or other such attachment means. A number of other polygonal or curved shapes may be used for the disclosed cleaning apertures within the shield. Moreover, many other punch and stripper configurations may be employed in combination with the die of the present invention. Various materials and dimensions have been disclosed in an exemplary fashion, however, a variety of other materials and dimensions may of course be employed. It is intended by the following claims to cover these and any other departures from the disclosed embodiments which fall within the true spirit of this invention.

I claim:

1. A die for forming a joint between sheets of material, said die comprising:

an anvil;

a substantially rigid shield coaxially and laterally surrounding said anvil, an outside surface of said shield having at least one normally unobstructed aperture at least one die blade disposed between said anvil and said shield; and means for biasing said at least one die blade toward said anvil.

2. The die of claim 1 wherein at least three of said die blades laterally surround said anvil and have portions which longitudinally project beyond said anvil, said at least three die blades being laterally movable away from said anvil during formation of said joint.

3. The die of claim 2 wherein said means for biasing further comprises:

a canted coil spring disposed between said at least three die blades and an inside surface of said shield, said canted coil spring retaining said at least three die blades within said die and being expandable to allow said lateral movement of said at least three die blades.

4. The die of claim 1 wherein said at least one aperture is defined as slotted in shape.

5. The die of claim 4 wherein said at least one aperture is open to a bottom edge of said shield.

6. The die of claim 4 wherein said at least one aperture is accessible from a bottom edge of said shield.

7. The die of claim 1 wherein portions of said anvil are cylindrical about a longitudinal axis and said outside surface of said shield is substantially cylindrical about said longitudinal axis.

8. The die of claim 1 further comprising:

five additional apertures extending through said shield.

9. The die of claim 1 wherein said at least one aperture is defined as circular in shape.

10. The die of claim 1 comprising:

a die body, said anvil integrally extending from said die body:

first means for snap fitting disposed on said die body; and second means for snap fitting disposed on said shield snappably engageable with said first snap fit means of said die body.

11. The die of claim 1 further comprising:

a die body, said anvil integrally extending from aid die body, an outside surface of said die body having a tapered recess;

a fixture located adjacent to said die body; and a fastener engaging said recess within said die body, said fastener serving to retain said die to said fixture.

12. The die of claim 1 wherein said joint formed against said die is defined as a leakproof interlocking joint.

13. The die of claim 1 wherein an upper edge of said at least one die blade is substantially coplanar with an upper edge of said shield prior to a joint being formed.

14. The die of claim 1 further comprising:

a punch assembly including a punch and a stripper, said stripper having an external and substantially cylindrical surface;

said outside surface of said shield being substantially cylindrical and having a substantially identical diameter to said external surface of said stripper.

15. The die of claim 1 further comprising:

a frusto conical tapered surface disposed on at least one contact surface of said anvil and a punch proximate with a peripheral contact edge.

16. The die of claim 1 wherein said at least one aperture opens substantially perpendicular to a longitudinal axis of said anvil.

17. A die for forming a continuous and nonlanced joint between within sheets of material, said die comprising:

an anvil;

a shield coaxially and laterally surrounding said anvil, said shield having an upper edge; and at least one die blade disposed and laterally movable between said anvil and said shield, said at least one die blade having an upper edge substantially coplanar with said upper edge of said shield prior to forming said continuous and nonlanced joint.

18. The die of claim 17 wherein at least three of said die blades laterally surround said anvil and have portions which longitudinally project beyond said anvil, said at least three die blades being laterally movable away from said anvil during formation of said joint.

19. The die of claim 18 further comprising:

a canted coil spring disposed between said at least three die blades and an inside surface of said shield, said canted coil spring retaining said at least three die blades within said die and being expandable to allow said lateral movement of said at least three die blades.

20. The die of claim 19 further comprising:

at least one aperture extending through an outside surface of said shield.

21. An apparatus for forming a joint between sheets of material, said apparatus comprising:

a die having an anvil, said anvil having a contact surface and an intersecting peripheral contact edge;

a punch assembly including a punch having a contact surface and an intersecting peripheral contact edge; and a frusto conical taper disposed along an entire portion of at least one of said peripheral contact edges, one of said sheets of material at said joint being forced to fake a final shape substantially identical to said taper and said contact surface.

22. The apparatus of claim 21 further comprising at least one die blade laterally surrounding said anvil and having a portion longitudinally projecting beyond said anvil, said at least one die blade being laterally movable away from said anvil during formation of said joint.

23. The apparatus of claim 22 further comprising:

a canted coil spring disposed between said at least one die blade in an inside surface of a shield, said canted coil spring retaining said at least one die blade within said die and being expandable to allow said lateral movement of said at least one die blade.

24. The apparatus of claim 21 wherein said frusto conical taper is between 4° and 8° degrees as measured from the adjacent of said contact surfaces.

25. An apparatus for forming a joint between sheets of material, said apparatus comprising:

a die having an anvil and a shield coaxially and laterally surrounding said anvil, said shield having a substantially cylindrical outside surface;

a punch assembly including a punch and a stripper surrounding at least a portion of said punch, said stripper having an external surface with substantially the same diameter as said outside surface of said shield; and at least one die blade laterally surrounding said anvil and having portions which longitudinally project beyond said anvil, said at least one die blade being laterally movable away from said anvil during formation of said joint.

26. The apparatus of claim 25 further comprising:

a canted coil spring disposed between said at least one die blade in an inside surface of said shield, said canted coil spring retaining said at least one die blade within said die and being expandable to allow said lateral movement of said at least one die blade.

27. A die for forming a joint between sheets of material, said die comprising:

a die body having a groove disposed, in a peripheral surface thereof; and an upstanding member having an internal surface with a protruding segment, said protruding segment of said upstanding member being snappably engagable with said groove of said die body.

28. The die of claim 27 wherein said upstanding member includes a die shield.

29. The die of claim 28 further comprising an anvil coaxially disposed within said shield and attached to said die body.

30. The die of claim 29 further comprising at least three of die blades laterally surrounding said anvil and having portions which longitudinally project beyond said anvil, said at least three die blades being laterally movable away from said anvil during formation of said joint.

31. A die for forming a joint between sheets of material, said die comprising:

a groove located on an upstanding member; and a protruding segment located on a peripheral surface of a die body, said protruding segment of said die body being snappably engagable with said groove of said upstanding member.

32. The die of claim 31 wherein said upstanding member includes a die shield.

33. The die of claim 32 further comprising an anvil coaxially disposed within said shield and attached to said die body.

34. The die of claim 33 further comprising at least three die blades laterally surrounding said anvil and having portions which longitudinally project beyond said anvil, said at least three die blades being laterally movable away from said anvil during formation of said joint.

35. A method of manufacturing a die comprising the steps of:

(a) machining a die body;

(b) machining a die shield; and (c) snap fitting said die shield to said die body.

36. The method of claim 35 further comprising the step of:

(a) heat treating the assembled combination of said die shield and said die body.

37. The method of claim 36 further comprising the step of:

(a) coating said assembled combination of said die shield and said die body with titanium nitride.

38. The method of claim 35 further comprising the steps of:

(a) placing a coil spring around a plurality of die blades; and (b) inserting said spring and said plurality of said die blades within said die shield.

* * * * *

UNITED STATES PATENT AND TRADEMARK OFFICE

CERTIFICATE OF CORRECTION

PATENT NO. : 5,727,302
DATED : March 17, 1998
INVENTOR(S) : Edwin G. Sawdon

It is certified that error appears in the above-indentified patent and that said Letters Patent is hereby corrected as shown below:

On the Title Page, in the Abstract, line 2, "70;" should be -- 70 --.

Column 4, line 67, after "aperture" insert -- ; --.

Column 5, line 34, ":" should be -- ; --.

Column 5, line 40, "aid" should be "said".

Column 5, line 48, delete "defined as".

Column 5, line 67, delete "within".

Column 6, line 32, "fake" should be -- take --.

Signed and Sealed this

Third Day of November, 1998

*Attest:*

BRUCE LEHMAN

*Attesting Officer*

*Commissioner of Patents and Trademarks*